United States Patent [19]

McCullough, Jr.

[11] Patent Number: 5,118,757

[45] Date of Patent: Jun. 2, 1992

[54] POLYMER PRODUCTION

[75] Inventor: James D. McCullough, Jr., Houston, Tex.

[73] Assignee: Shell Oil Company, Houston, Tex.

[21] Appl. No.: 498,886

[22] Filed: Mar. 26, 1990

[51] Int. Cl.$^5$ .................. C08F 2/00; C08F 297/08
[52] U.S. Cl. ........................... 525/53; 525/52; 525/54; 525/240; 525/322
[58] Field of Search .................... 525/52, 53

[56] References Cited

U.S. PATENT DOCUMENTS

| | | | |
|---|---|---|---|
| 3,962,196 | 6/1976 | Weimer et al. | 526/74 |
| 4,551,509 | 11/1985 | Takayuki et al. | 526/68 |
| 4,650,841 | 3/1987 | Levresse et al. | 526/68 |

FOREIGN PATENT DOCUMENTS 225099 6/1987 European Pat. Off. .
8846211 2/1988 Japan .

Primary Examiner—Carman J. Seccuro

[57] ABSTRACT

In the gas phase, two stage process for the production of polypropylene impact copolymer, the fouling of the second stage recycle loop and the heat exchange unit incorporated therein is reduced by the addition to the substantially gaseous material passing through the loop of a small amount of alkylene compound selected from alkylene glycol compounds, alkylene glycol derivatives of alkylene diamines or ethers or esters thereof.

23 Claims, No Drawings

POLYMER PRODUCTION

FIELD OF THE INVENTION

This invention relates to the production of certain polyolefin compositions of good impact strength. More particularly, the invention relates to an improved process for the gas phase production of propylene/ethylene copolymers in which the degree of fouling within the reactor system is reduced.

BACKGROUND OF THE INVENTION

Polymeric polypropylene compositions have gained wide commercial acceptance and usage in numerous applications because of the relatively low cost of the polymers and the desirable properties they exhibit. Polypropylene homopolymers, however, have the disadvantage of being brittle with low impact resistance, particularly at low temperatures. Most procedures proposed for modifying the properties of polypropylene homopolymer to improve the impact strength have included the provision of a polypropylene/other α-olefin copolymer phase in an otherwise homopolymeric polypropylene. A propylene/ethylene copolymer phase is particularly useful for this purpose. The structure of such products is not entirely certain with some sources referring to a block copolymer and other sources referring to other structures. However, such materials are well known and of substantial commercial importance. They are referred to as polypropylene impact copolymers, regardless of the precise nature of their structure, and are said to contain a homopolymer phase (often polypropylene homopolymer) and a rubber phase (the copolymer phase).

A typical process for the production of a polypropylene impact copolymer is conducted in at least two stages in at least two reactors. The homopolymer phase is conventionally produced first in one or more reactors and the product of this first stage together with any unreacted monomer is then passed to a second stage where the copolymer phase is produced. It is in the second stage that a large proportion of the processing difficulties for the overall process are encountered. In slurry, bulk or other solvent/diluent based processes, swelling and partial dissolution of the rubbery second stage product can take place. As a result, the polymer product of the second stage is tacky and adheres to the walls of the reactor and other internal surfaces, e.g., stirring blades. This reaction system fouling is also a problem, in fluidized bed gas phase processes wherein the second stage reactor has a recycle loop in which the unreacted gaseous monomers are passed through a heat exchange unit to remove heat of reaction and then returned to the reactor. Conventional heat exchange units contain a large number of relatively small diameter tubes and these restrictive passages are particularly vulnerable to fouling.

Control of the relative proportions of homopolymer portion and copolymer portion, as well as to some extent the degree of fouling in the second stage reactor, can be effected by the addition of various materials to the reactor. In general, such additives include catalyst deactivators which "kill" or reduce catalyst activity.

In U.S. Pat. No. 4,551,509 Takayuki et al disclose the addition of a polyalkylene glycol to the reaction mixture of a reactor system for producing ethylene homopolymers or copolymers in order to deactivate the catalyst. Levresse et al, U.S. Pat. No. 4,650,841, disclose the use of certain amides, polyalkylene polyols or epoxides for a similar purpose but the additive is introduced into a monomer recycle stream after removal from the stream of a polymer product. Weimer et al, U.S. Pat. No. 3,962,196, employ heterocyclic additives such as N-vinylpyrrolidone to reduce polymer deposits on the interior walls of a polymerization reactor.

In published European Patent Application 225,099 the properties of a polypropylene impact copolymer are said to be improved by catalyst deactivation with a polyalkylene glycol ether in specified quantity relative to the quantity of the titanium component of the polymerization catalyst. The process was a batch, liquid phase process and the glycol ether was introduced in between the first and second stages or added directly to the second stage reactor. As a part of the overall effect of this addition of glycol ether, the activity of the second stage polymerization catalyst is reduced to 30% to 80% of the catalyst activity before addition.

A closely related process is disclosed by Chiba et al, published Japanese Patent Application 8846211, disclosure date Feb. 27, 1988. In this process, which may be gas phase, a polyalkylene glycol ether is added continuously in specified ratio to the titanium to the second stage reactor. The addition may be between the first and second stage reactors or directly to the second stage reactor. In the gas phase modification of the process, preference is stated for adding the glycol ether to the recycle loop downstream from the heat exchanger. In this process as well, the catalytic activity of the second stage polymerization catalyst is reduced to 30% to 80% of the activity before glycol ether addition. The addition to the recycle loop appears to be for convenience only and the addition of the glycol ether to the recycle loop prior to passage through the heat exchange unit is not apparently contemplated.

There are substantial advantages to adding a catalyst deactivator in the recycle loop but prior to reaching the heat exchanger. The polymerization catalyst present in this recycle stream is necessarily small and consists mainly of catalyst fines and particles containing only a partial coating of polymer. As a result, the amount of a catalyst deactivator needed to reduce the activity of the catalyst present in the recycle loop and therefore reduce fouling of the heat exchange tubes is also small. Particularly when the catalyst deactivator is efficient is the activity of the second stage reactor not substantially adversely influenced by any proportion of the catalyst deactivator which is eventually passed to the second stage reactor. It is known from copending U.S. patent application Ser. No. 447,049, filed Dec. 7, 1989, that the addition of small amounts of certain aromatic esters to the recycle loop upstream from the heat exchange unit is beneficial in reducing fouling of the heat exchange tubes without unduly adversely affecting the activity of the second stage polymerization catalyst. The ester ethyl p-ethoxybenzoate has been commercially used for this purpose since late 1988. Nevertheless, it would be of advantage to provide more efficient catalyst deactivators for introduction into the recycle loop between the second stage reactor and the heat exchange unit in order to more effectively reduce the degree of fouling of the heat exchanger tubes.

SUMMARY OF THE INVENTION

The present invention provides an improved method for the production of polypropylene impact copolymers. More particularly, the present invention provides an improved two-stage, gas phase process for the production of polypropylene impact copolymers wherein the fouling of the recycle loop of the second stage reactor and the heat exchange unit contained therein is reduced by the introduction of certain alkylene compounds in the recycle loop stream between the outlet from the second stage reactor and the heat exchange unit.

DESCRIPTION OF THE INVENTION

The polypropylene impact copolymer compositions of the invention are typically produced by a two stage process. Olefin polymerization processes broadly may employ a liquid, non-polymerizable diluent or alternatively may employ as liquid diluent a monomer of the polymerization, especially propylene. To produce the present polypropylene impact polymers having a particularly desirable combination of properties it is necessary to employ a gas phase process.

The polymerization process is conducted in the presence of a stereoregular olefin polymerization catalyst. Such catalysts are broadly well known and conventional and are employed in the polymerization of α-olefins of three or more carbon atoms to produce stereoregular products. In terms conventionally employed to describe such catalysts, the stereo-regular catalysts of high activity contain as a first constituent a procatalyst which is a titanium-containing solid, usually a titanium halide-containing solid, and which often contains an electron donor. Suitable electron donors include ethers, esters, ketones, phenols, amines, amides, imides, nitriles, phosphines, phosphites, stilbenes, arsines, phosphoramides and alcoholates, which may be used singly or in combination. Preferred electron donors are aromatic esters and particularly preferred are ethyl benzoate and isobutyl phthalate.

The second catalyst constituent, termed a co-catalyst, is an organoaluminum compound which may be partly or totally complexed with the third catalyst constituent, conventionally termed a selectivity control agent. Illustrative selectivity control agents include aromatic esters, amines and particularly hindered amines, aliphatic esters, phosphites, phosphates, silanes, particularly alkoxysilanes and aryloxysilanes, hindered phenols and mixtures thereof.

Such stereoregular olefin polymerization catalysts are described in numerous patents and other references including Nestlerode et al, U.S. Pat. No. 4,728,705. Although a variety of chemical compounds are useful as the constituents of the polymerization catalyst, a typical stereoregular olefin polymerization catalyst contains as a procatalyst a solid comprising magnesium halide, a titanium halide and an electron donor such as ethyl benzoate. The halide moieties of such procatalysts are customarily chloride moieties. The co-catalyst is typically triethylaluminum or triisobutylaluminum which is often at least partially complexed with an aromatic ester such as ethyl p-ethoxybenzoate or methyl p-methylbenzoate or with a silane such as diisobutyldimethozysilane as the selectivity control agent. Use of the catalyst of this type results in a stereoregular polymeric product when α-olefins of three or more carbon atoms are polymerized. Many of the stereoregular olefin polymerization catalysts are also recognized as high activity catalysts which are able to catalyze the formation of polymers of desirable properties without the necessity of removing catalyst residues in a de-ashing step. The polymerization process to which the present invention is applied is a gas phase process. A number of gas phase processes are available but one such process which is illustratively and suitably used in accordance with the invention is described by Goeke et al, U.S. Pat. No. 4,379,759, which involves a fluidized bed, continuous gas phase process. The Goeke et al reference and the references cited therein relative to gas phase processes, are incorporated herein by reference.

A gas phase process is typically operated by charging to a suitable reactor an amount of preformed polymer particles and a lesser amount of catalyst components. The olefin or olefins to be polymerized are provided as a gas passed through the bed of particles at a high rate and under polymerization conditions of temperature and pressure sufficient to initiate polymerization. Upon passing through the particle bed the unreacted gas is withdrawn from the reactor and recycled together with make-up feed gas. As the catalyst is lost through incorporation of a minute amount of catalyst in the polymer product, additional catalyst is provided to the reactor, often through the use of an inert transport gas such as nitrogen or argon. The reaction temperature is suitably within the range of from about 30° C. to about 120° C., preferably from about 50° C. to about 90° C. The reaction temperature is maintained within this range at least in part through the use of a recycle loop. A portion of the gaseous monomers are removed from the reactor, after passage through the particle bed, together with small amounts of entrained catalyst which primarily comprises catalyst fines and particles of catalyst which are only partly covered by polymer. The monomer stream is then passed through a heat exchange unit to remove heat of reaction and returned to the reactor. It is the detrimental fouling of this recycle loop in the second stage reactor which is addressed by the present invention. The second stage reaction pressure is generally up to about 1000 psi, with pressures from about 100 psi to about 400 psi being preferred. An additional means of process and product control is achieved by the provision for addition of molecular hydrogen to the reactor and thus the polymerization system. The addition of molecular hydrogen serves to control the molecular weight of the polymeric product and, in the second stage reactor the relative proportions of homopolymer and copolymer portions. Although it is not desired to be limited by any particular theory it is likely that the molecular hydrogen serves as a chain transfer agent. The precise control of reaction conditions, the rate of addition of catalyst, feed gas and molecular hydrogen as well as the rate of recycle of unreacted monomer is broadly within the skill of the art.

The gas phase process of the invention is operated as a two stage process wherein each stage operates in the gas phase in one or more reactors. In the first stage the homopolymer phase is produced which is predominantly but not necessarily propylene homopolymer. To obtain products of particular properties it may be useful to incorporate in the otherwise homopolymer portion a small amount, i.e., up to about 6% by weight, of a second α-olefin such as ethylene, 1-butene or an even higher molecular weight α-olefin. The optional incorporation of other α-olefin is by conventional methods and serves to modify but not substantially change the properties of the homopolymer portion. In such embodiments where small amounts of other olefin are present, the polymer product is still referred to as the homopolymer phase although technically it is copolymeric. Homopolymeric phases produced from substantially entirely polypropylene, i.e., phases produced in the substantial absence of other α-olefins, are preferred.

The olefin feed to the first stage reactor is passed through the particle bed and the desired polymer product is formed by growth of polymer product on the polymer particles provided to the reactor or as particles formed in the reactor. A portion of the product is formed by coating, either partially or completely, the catalyst particles provided to the reactor. The polymer product is removed from the reactor at a rate substantially equivalent to the rate of polymer production and passed to the second stage reactor.

The product of the second stage reaction, which also may be conducted in one or more reactors, is predominantly a copolymer of ethylene and propylene although small amounts of other α-olefin moieties could optionally be present. Through control of the proportion of unreacted propylene from the first stage reaction and the proportion of ethylene provided to the copolymerization reactor it is possible, and conventional, to vary the proportion of ethylene in the ethylene/propylene copolymer phase. Within the impact copolymers produced according to the invention the proportion of ethylene in the copolymer phase is suitably from about 35% by weight to about 95% by weight based on the total copolymer phase. Proportions of ethylene in the copolymer phase from about 35% by weight to about 65% by weight on the same basis are preferred. It is also conventional to control the molecular weight of the copolymer portion as by introduction of molecular hydrogen and to control the relative amounts of the homopolymer and the copolymer phases. The copolymer phase of the total polypropylene impact copolymer is suitably from about 10% by weight to about 60% by weight of the total impact copolymer composition. Proportions of the copolymer phase from about 10% by weight to about 40% by weight on the same basis are preferred.

The polymerizations which take place in both reaction stages are exothermic reactions and some provision must be made for removal of the accumulated heat of reaction. A variety of methods are useful for this purpose but one method which is particularly useful is to remove from the reactor at least a portion of the primarily gaseous material which has passed from the catalyst bed and convey such material through a conduit which includes a compressor and a heat exchange unit and then return the relatively cool primarily gaseous material to the reactor for additional passage through the catalyst bed. This conduit is typically termed a recycle loop whose function is to maintain a desired reaction temperature by removal of heat by the heat exchange unit, and to provide gas flow for bed fluidization for that class of gas phase polymerizations.

The primarily gaseous material comprises, as the major component, the unreacted monomer gases that have passed through the catalyst bed. However, this material will also contain entrained particles of active catalyst, particularly those small irregular catalyst particles often referred to as "fines" as well as catalyst particles which are partially although not completely covered with polymer product. It is this mixture of monomer and active catalyst that leads to fouling of the reactor recycle loop, particularly the relatively small diameter passages of the heat exchange unit. Although this potential for fouling exists in both the first and the second stage reactor recycle loops, the nature of the homopolymer product of the first stage reactor is such that fouling is a rather minor problem. However, in the recycle loop of the second stage reactor a substantial problem exists and it is to this recycle loop fouling that the present invention is directed. The product of the second stage reactor is rather rubbery in character and, being somewhat "sticky" and "tacky" it can and will adhere to the walls of the conduit which comprises the second stage reactor recycle loop. Over time the buildup of such undesirable polymer will foul and eventually clog the heat exchanger tubes. As heat exchanger tubes accumulate fouling deposits, the pressure drop across the heat exchanger increases, and the deposits reduce the cooling efficiency of the heat exchanger, since they form an insulating boundary. With continued operation, a point would be reached where either the pressure drop across the heat exchanger exceeds the compressor operational limit or the heat exchanger efficiency falls below the acceptable limit. In either event, the polymerization unit must be shut down. The present invention provides a selective catalyst deactivator introduced near the entrance and preferably within the recycle loop ahead of the heat exchanger, which will "kill" the catalyst entrained in the primarily gaseous material entering the recycle loop and thereby retard the production of rubbery copolymer within the recycle loop and reduce the fouling which would otherwise take place within that loop, particularly within the heat exchange unit component of the loop. Because the amount of active polymerization catalyst is rather small the amount of catalyst deactivator is also small so that the fouling of the recycle loop can be retarded while not unduly reducing the catalytic activity within the second stage reactor. The improved process of the invention therefore comprises the provision of certain alkylene materials as catalyst deactivators introduced within the recycle loop or near the entrance thereof, but in all cases, ahead of the heat exchanger, in quantities sufficient to substantially reduce or eliminate the catalytic activity of polymerization catalyst entering and passing through the recycle loop. The catalyst deactivator is provided by continuous or intermittent injection of substantially liquid deactivator into the substantially gaseous material entering the recycle loop. Contact of this deactivator and entrained catalyst particles serves to reduce or eliminate the catalyst activity of such particles as well as production of rubbery copolymer within the recycle loop and the fouling that results from the production of polymer.

The catalyst deactivators to be provided to the recycle loop are alkylene compounds selected from alkylene glycol compounds or alkylene glycol derivatives of alkylenediamine, or ether or ester derivatives thereof. The alkylene glycol compounds or derivatives are represented by the formula $$R-O+(C_nH_{2n}-O)_x R \qquad (I)$$

wherein n is 2 or 3, R independently is hydrogen, alkyl of up to 20 carbon atoms or acyl of up to 20 carbon atoms, or any combination thereof, and x independently is a number from 1 to about 10. Further, the invention includes compounds wherein random incorporation (in a statistical sense) or blocked sequences of different alkylene oxide species, e.g., propylene oxide and ethylene oxide, are copolymerized as part of the structure. At least one R is preferably alkyl or acyl. The alkylene glycol derivatives of alkylenediamine or derivatives thereof are represented by the formula

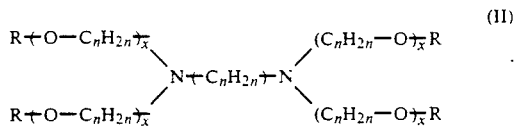

wherein R, n and x have the previously stated meanings, including the afore stated compounds having a random or blocked alkylene oxide incorporation.

Illustrative R groups in addition to hydrogen include alkyl groups such as methyl, ethyl, hexyl, octyl and tetradecyl as well as acyl groups such as acetyl, butyryl and dodecanoyl. The term n is independently 2 or 3 but within any given alkylene moiety the term n will be constant. The term x represents the total number of alkylene oxide moieties present and may be an integer but may also be an average of alkylene oxide moieties in a mixture of compounds so that x is not necessarily a whole number.

Suitable alkylene glycol compounds and ether and ester derivatives thereof are illustrated by ethylene glycol, propylene glycol, diethylene glycol, tetrapropylene glycol, hexaethylene glycol, decapropylene glycol, ethylene glycol monomethyl ether, diethylene glycol dihexyl ether, tripropylene glycol monooctyl ether, tetradecaethylene glycol dipropyl ether, ethylene glycol monoacetate, dipropylene glycol dibutyrate, tetraethylene glycol monohexanoate and hexapropylene glycol didecanoate. Mixtures of any of the above, and particularly of mono and di-esters and ethers, are contemplated in this invention. In general, the alkylene glycol ethers and esters are preferred over the corresponding alkylene glycols. Also preferred are those alkylene glycol compounds or ether and ester derivatives thereof wherein the term x is a whole number from 1 to 4 and each n is 2 or 3. Especially preferred are dipropylene glycol mono and diethers, and diethylene glycol mono and diesters.

The alkylene glycol derivatives of alkylene diamine are illustrated by compounds such as N,N,N',N'-tetra(2-hydroxyethyl)ethylenediamine and N,N,N',N'-tetra(3-hydroxypropyl)-1,3-propylenediamine, N,N'-di(2-methoxyethyl)ethylenediamine, N,N,N'-tri(3-propanoylpropyl)propylenediamine, N-(2-hydroxyethyl)-N,N'-di(2-propyloxyethyl)ethylenediamine and N,N,N',N'-tetra(2-acetyloxyethyl)propylenediamine. In the case of these alkylene glycol derivatives of alkylene diamine, those compounds of formula II wherein each R is hydrogen are preferred as are derivatives of ethylenediamine. A particularly preferred class of such compounds is produced by sequential reaction of propylene oxide and ethylene oxide with ethylenediamine. Certain of these compounds are commercial and are marketed by BASF/Wyandotte under the trademark TETRONIC ® Polyols.

The catalyst deactivator is introduced into the second stage recycle loop at a point between the entrance to the loop from the second stage reactor and the heat exchanger. The precise point of introduction is not critical, but best results are obtained when the point of introduction is near the compressor inlet, wherein the compressor is situated ahead of the heat exchanger in the recycle loop. The amount of catalyst deactivator is rather small because of the relatively small amount of catalyst present in the recycle loop stream. Amounts of the catalyst deactivator continuously added should be at least nearly equimolar with aluminum alkyl carryover to the recycle loop with fines (0.5 to 12.0 on a molar ratio basis of deactivator to aluminum alkyl). It is preferred that the ratio be within 0.7 to 2.0. The catalyst deactivator is suitably applied by introducing it simultaneously with the passage of unreacted monomer through the recycle loop and the addition is preferably continuous for so long as material passes through the recycle loop, although addition of catalyst deactivator in increments at short intervals is also satisfactory.

It appears likely that the added catalyst deactivator serves to coat the walls of the recycle loop and the catalyst particles entrained in the gaseous material passing through the recycle loop and thereby reduce or prevent the formation of copolymer in the recycle loop and particularly in the heat exchange unit through which the gaseous material passes. In any event, however, the fouling of the recycle loop is substantially reduced, which enables extended operation of the process without the need for shut-down to remove fouling deposits, and any small amount of the catalyst deactivator which does pass through the recycle loop and back to the second stage reactor is sufficiently small so as not to substantially reduce the activity of the catalyst in the second stage reactor. The net effect of the addition of catalyst deactivator to the recycle loop of the second stage reactor is to permit operation for longer periods because of reduced fouling while maintaining a high catalyst activity in the second stage reactor. These improvements are most easily recognized in the improved economics of the overall polymerization process.

The invention is further illustrated by the following Comparative Example (not of the invention) and the Illustrative Embodiments which should not be regarded as limiting.

COMPARATIVE EXAMPLE

In order to demonstrate the effect of employing a small amount of a catalyst deactivator in the second stage recycle loop, a production run was made wherein polypropylene impact copolymer was produced utilizing a commercial-type, high activity, stereoregular olefin polymerization catalyst. The catalyst deactivator ethyl p-ethoxybenzoate was used as the deactivator. The degree of fouling in the recycle loop was measured as a function of the increase in pressure drop across the heat exchanger incorporated within the loop. No increase in pressure drop is interpreted as evidence of little or no fouling.

The ethyl p-ethoxybenzoate was introduced into the reactor loop upstream from the heat exchanger in a quantity of 0.2 lb/hr, which is approximately equimolar relative to the aluminum content of the catalyst particles entrained in the vapors passing through the recycle loop. For so long as the addition of ethyl p-ethoxybenzoate was continued, no increase in the pressure drop across the heat exchanger was observed. As a test, the addition of the ethyl p-ethoxybenzoate was stopped. After a one day induction period, the pressure drop increased 3 psi over a 3 day period. At this time the flow of ethyl p-ethoxybenzoate was restarted and after 4 hours no further increase in pressure drop was observed.

ILLUSTRATIVE EMBODIMENT I

To compare the relative effectiveness of candidate catalyst deactivators in deactivating commercial-type, high activity, stereoregular olefin polymerization catalysts, a series of experiments was conducted, for convenience, in a gas phase, fluidized bed reactor lined-out under polypropylene homopolymerization conditions substantially similar to those of a commercial production. The several candidate deactivators were diluted in isopentane and charged to the reactor after polymerization was proceeding. The flow of propylene feed and the hydrogen employed for molecular weight control continued, but no additional catalyst agents were added and product discharge from the reactor was halted.

As a measure of continuing catalyst activity, the increase in the weight of the polymer bed was determined over time. A relatively large increase in bed weight is considered to reflect continued polymer production and catalyst activity and therefore demonstrate a relatively ineffective catalyst deactivator. A relatively low gain in bed weight is considered to reflect loss of catalyst activity and thus an effective catalyst deactivator. The candidate catalyst deactivators tested were
A. Ethyl p-ethoxybenzoate,
B. Dipropylene glycol monomethyl ether,
C. Diethyleneglycol laurate: 35–40% w monoester, 50–55% w diester, 8% w laurate soaps (K or Na), 2% w free fatty acid, and
D. Diisobutyldimethoxysilane.

The results of the evaluation are shown in Table 1.

TABLE I

| Catalyst deactivator, ppm by mole basis propylene | Weight gain in 1 hour, lbs. |
| --- | --- |
| None, 0 | 30.09 |
| A, 50 | 26.16 |
| A, 75 | 10.89 |
| A, 100 | 10.89 |
| B, 25 | 22.67 |
| B, 50 | 9.74 |
| C, 25 | 25.56 |
| C, 50[1] | 17.27 |
| D, 250[1] | 27.95 |
| D, 500[1] | 27.10 |

[1]Calculated on the basis of the molecular weight of diethylene glycol monolaurate.

ILLUSTRATIVE EMBODIMENT II

To determine the relative effectiveness of several candidate catalyst deactivators on the catalytic activity of several commercial-type, high activity, stereoregular olefin polymerization catalysts, production of propylene/ethylene copolymer was conducted in a 1 liter autoclave. For convenience, the candidate deactivators were added directly to the autoclave during production of a copolymer which was 40% by weight ethylene. The reactor was designed to maintain a constant propylene pressure and an ethylene pressure that was stoichiometric relative to the propylene. Propylene was added, and correspondingly ethylene, as required to maintain the desired pressure. The relative efficiency of the catalyst deactivator was measured by the decrease of the rate of propylene fed to the reactor. A constant feed rate was taken as an indication of constant polymer production and catalytic activity and therefore an inefficient catalyst deactivator. A large decrease in polypropylene feed rate was interpreted as indicative of a substantially reduced rate of polymer production and therefore an effective catalyst deactivator. The results of the evaluation are shown in Table II wherein the term "Ratio" is the weight ratio of catalyst deactivator to titanium in the polymerization catalyst. The deactivators tested were
A. Ethyl p-ethoxybenzoate,
B. Dipropyleneglycol monomethyl ether, and
C. Diisobutyldimethoxysilane.

TABLE II

| | Deactivator | Ratio | Propylene flow rate decrease, % |
| --- | --- | --- | --- |
| Catalyst 1 | C | 271.25 | 46.6 |
| | C | 1111.25 | 75.0 |
| | C | 2231.25 | 93.5 |
| | A | 271.25 | 40.0 |
| | A | 1111.25 | 64.0 |
| | A | 2231.25 | 68.0 |
| | B | 61.25 | 60.4 |
| | B | 271.25 | 94.0 |
| | B | 1111.25 | 93.5 |
| Catalyst 2 | C | 271.25 | 50.0 |
| | C | 1111.25 | 81.0 |
| | C | 2231.25 | 82.6 |
| | A | 271.25 | 61.9 |
| | A | 1111.25 | 74.4 |
| | B | 61.25 | 27.0 |
| | B | 271.2 | 74.2 |
| | B | 1111.25 | 100.0 |

What is claimed is:

1. In the process of producing polypropylene impact copolymer in a two stage gas phase process wherein a homopolymer phase is produced in a first stage and a copolymer phase is produced in a second stage by polymerization of propylene and other α-olefin and wherein heat is removed from the second stage by removing a portion of the primarily gaseous material having passed from the catalyst bed and passing the material through a recycle loop containing a heat exchange unit and returning the cooled material to the reactor, the improvement of reducing fouling of the second stage recycle loop by introducing to the loop an alkylene compound at a point between the outlet from the reactor and the heat exchange unit.

2. The process of claim 1 wherein the alkylene compound is selected from alkylene glycol compounds of the formula $$R-O+(C_nH_{2n}-O)_x-R$$

or alkylene glycol derivatives of alkylenediamine of the formula

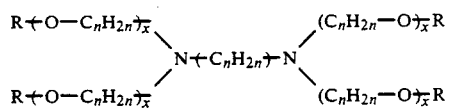

wherein R independently is hydrogen, alkyl of up to 20 carbon atoms or acyl of up to 20 carbon atoms, n is 2 or 3 and x independently is a number from 1 to about 10.

3. The process of claim 2 wherein the alkylene compound is an alkylene glycol compound.

4. The process of claim 3 wherein R is hydrogen or alkyl.

5. The process of claim 4 wherein R is alkyl.

6. The process of claim 4 wherein n is 2.

7. The process of claim 4 wherein n is 3.

8. The process of claim 3 wherein R is hydrogen or acyl.

9. The process of claim 8 wherein n is 2.

10. The process of claim 2 wherein the alkylene compound is an alkylene glycol derivative of alkylene diamine.

11. The process of claim 10 wherein R is hydrogen or alkyl.

12. The process of claim 11 wherein n is 3.

13. The process of claim 11 wherein n is 2.

14. The process of claim 13 wherein R is alkyl.

15. In the process of producing polypropylene impact copolymer in a two stage gas phase process wherein a homopolymer phase is produced in a first stage and a copolymer phase is produced in a second stage by polymerization of propylene and ethylene and wherein heat is removed from the second stage by removing a portion of the primarily gaseous material having passed from the catalyst bed and passing the material through a recycle loop containing a heat exchange unit and returning the cooled material to the reaction, the improvement of reducing fouling of the second stage recycle loop by introducing to the loop at a point between the outlet from the reactor and the heat exchange unit an alkylene compound selected from alkylene glycol compounds of the formula

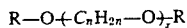

or alkylene glycol derivatives of alkylenediamine of the formula

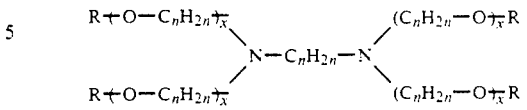

wherein R independently is hydrogen, alkyl of up to 20 carbon atoms or acyl of up to 20 carbon atoms, n is 2 or 3 and x independently is a number from 1 to about 10.

16. The process of claim 15 wherein the alkylene compound is an alkylene glycol compound.

17. The process of claim 16 wherein n is 2.

18. The process of claim 17 wherein R is hydrogen or alkyl.

19. The process of claim 17 wherein R is alkyl.

20. The process of claim 17 wherein R is hydrogen.

21. The process of claim 15 wherein the alkylene compound is an alkylene glycol derivative of alkylenediamine.

22. The process of claim 21 wherein n is 2.

23. The process of claim 21 wherein the alkylene compound is the product of sequential polymerization of propylene oxide and ethylene oxide with ethylenediamine.

* * * * *